(12) United States Patent
Horiuchi

(10) Patent No.: US 7,114,945 B2
(45) Date of Patent: Oct. 3, 2006

(54) BLOW MOLD DEVICE

(75) Inventor: Takaharu Horiuchi, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 386 days.

(21) Appl. No.: 10/485,939

(22) PCT Filed: Jul. 26, 2002

(86) PCT No.: PCT/JP02/07629

§ 371 (c)(1),
(2), (4) Date: Jan. 30, 2004

(87) PCT Pub. No.: WO03/011570

PCT Pub. Date: Feb. 13, 2003

(65) Prior Publication Data

US 2005/0025855 A1 Feb. 3, 2005

(30) Foreign Application Priority Data

Jul. 31, 2001 (JP) .............................. 2001-231865

(51) Int. Cl.
*B29C 49/48* (2006.01)
(52) U.S. Cl. ...................................... 425/538; 425/541
(58) Field of Classification Search ................ 425/538, 425/541
See application file for complete search history.

(56) References Cited

U.S. PATENT DOCUMENTS

| 2,298,716 | A | * | 10/1942 | Moreland et al. | ............ 425/533 |
| 2,353,825 | A | * | 7/1944 | Hofmann | ..................... 425/541 |
| 5,332,384 | A | * | 7/1994 | Abramat | ..................... 425/541 |
| 5,486,103 | A | | 1/1996 | Meiring et al. | ............. 425/541 |

FOREIGN PATENT DOCUMENTS

JP 8-229991 A 9/1996

* cited by examiner

*Primary Examiner*—Robert B. Davis
(74) *Attorney, Agent, or Firm*—Weingarten, Schurgin, Gagnebin & Lebovici LLP

(57) ABSTRACT

The shifting of the parting line between split molds due to mold clamping force is prevented. A blow mold device (11) wherein a pair of split molds forming a blow cavity (12) are a set of molds, and a plurality of such sets are attached in parallel to mold-attaching plates (15, 16) with a clearance defined between adjacent sets. One split mold (13) is attached by bolts (17) inserted in bolt holes (23) in the form of loose holes in the mold-attaching plate (15) in such a manner as to allow relative lateral shifting of the split mold (13) and mold-attaching plate (15). The other split mold (14) is fixedly attached to the mold-attaching plate (16) by locating pins (18) and bolts (17). A joint is installed that integrally connects the two split molds to their parting surface and that is composed of a taper pin (19) and a socket (21) for preventing the shifting of the parting line.

2 Claims, 5 Drawing Sheets

BLOW MOLD DEVICE

This application is a 371 national phase filing of PCT/JP02 07629 filed Jul. 26, 2002, and claims priority to a Japanese application No. 2001-231865 filed Jul. 31, 2001.

FIELD OF THE INVENTION

The present invention concerns a blow mold device used in the case where an injection-molded preform is blow-molded into a hollow mold such as a bottle and a wide-mouthed container.

BACKGROUND ART

In an ordinary blow mold device, as shown in FIG. 6, split molds 1a, 1b where a blow cavity 2 is formed in the parting face are served as a set of molds, a blow mold device 1 is composed of a plurality of sets thereof by arranging in parallel on mold-attaching plates 3, 3 by a locating pin 4 and a bolt 5 spacing with a clearance between the plural sets, and the blow mold device is attached by making the mold-attaching plates 3, 3 into contact with the opposed faces of movable platens 6, 7 inside and outside a mold clamping apparatus.

The inside movable platen 6 has a plunger 8 coupled to the back center, and an outside movable platen 7 has rods 9, 9 coupled to both sides passing through the inside movable platen 6, so that both of the aforementioned movable platens 6, 7 move simultaneously facing to each other, and the mold close of the blow mold 1 is executed in the middle between the platens, allowing the mold to open, close, and clamping by hydraulically operating the plunger 8 and rods 9, 9 simultaneously.

In such mold clamping apparatus, mold clamping force by the plunger 8 acts on the central section of the inside movable platen 6 as pressing force, while mold clamping force by the rods 9, 9 comes to acts on both sides of the outside movable platen 7 as tensile force. Consequently, the distribution of opposed mold clamping forces is differently applied on both platens, and both movable platens 6, 7 are deflected inwardly (chain line direction) and bent backward.

According to this deflection, the aforementioned mold-attaching plates 3, 3 also finish up by deflecting similarly; however, as there is a space between adjacent molds for split molds 1a, 1b, the split mold 1a where the mold-attaching plate 3 is attached on the outside movable platen 6 finishes up by tilting inward, and on the contrary, the split mold 1b where the mold-attaching plate 3 is attached on the outside movable platen 7 finishes up by tilting outward. The shift due to this inclination in the opposite directions increases gradually from the central section to both sides, and in the split molds 1a, 1b places at both sides, as shown enlarged in the drawing, it becomes a considerable shifting of the parting line PL, and finishes up by creating a longitudinal shoulder on the side of the blow cavity 2.

If an injection molded preform (not shown) is pinched by the neck and inserted in the blow cavity 2 of such state, stretch blow molded full in the cavity, the trace of the parting line is transferred on the middle of the side body section of a molded product therein, and left there as a considerably protruded stripe. The parting line mark on the body is undesirable for labeling or others processes, and is rejected as defective for the packaging container of contents of high added value.

DISCLOSURE OF THE INVENTION

The present invention devised to solve the aforementioned problems of the prior art and has an object to provide a novel blow mold device that can prevent the shifting of the parting line between split molds each other by the mold clamping force, by attaching one of a pair of split molds composing a set of molds in a state laterally movable in respect of the mold-attaching plates, and coupling both of them by a joint, and thereby solve the problem of the parting line mark on the product.

The present invention according to the aforementioned object is a blow mold devise attaching a plurality of sets of molds in parallel on and between a pair of mold-attaching plates with a clearance defined between adjacent sets of molds, each such one set of molds constituting a pair of split molds forming a blow cavity, wherein;

one split mold of the pair is attached with a bolt inserted in a loose bolt hole perforated in one mold-attaching plate so that the split mold and the mold-attaching plate can shift laterally and relatively in molds closing as far as within a space formed between the loose bolt hole and the bolt inserted therein, the other split mold of the pair is fixedly attached to the other mold-attaching plate with a locating pin implanted in the mold-attaching plate and a bolt, and in molds closing both split molds are connected integrally and closely on both parting faces of them, and both of a taper pin and a socket provided with the pair of molds as a joint operate to secure both the molds mutually so as for a parting line not to fluctuating, and the pair of split molds as one set of molds forms a plurality of blow cavities, and the joint is buried between the blow cavities or on the parting faces of both sides.

BRIEF DESCRIPTION OF THE DRAWINGS

These and other objects and advantages of the present invention will become clear from the following description with reference to the accompanying drawings, wherein.

BEST MODE FOR CARRYING OUT THE INVENTION

Figure 1:
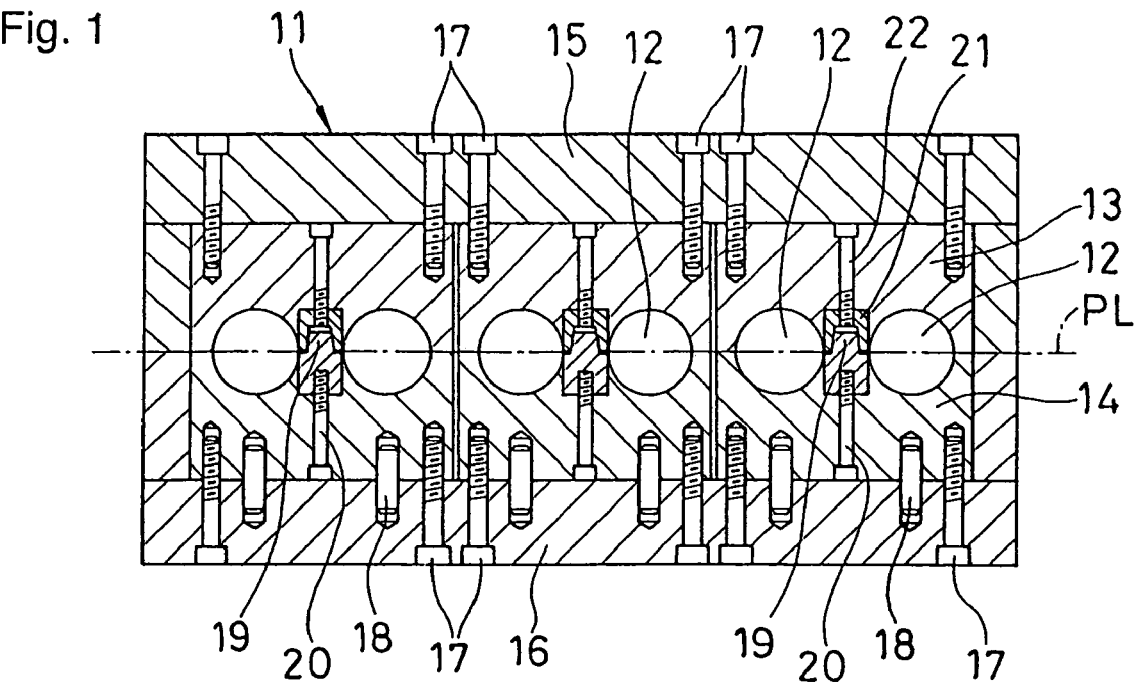
FIG. 1 is a plane cross-section of a blow mold device according to the present invention.
Figure 2:
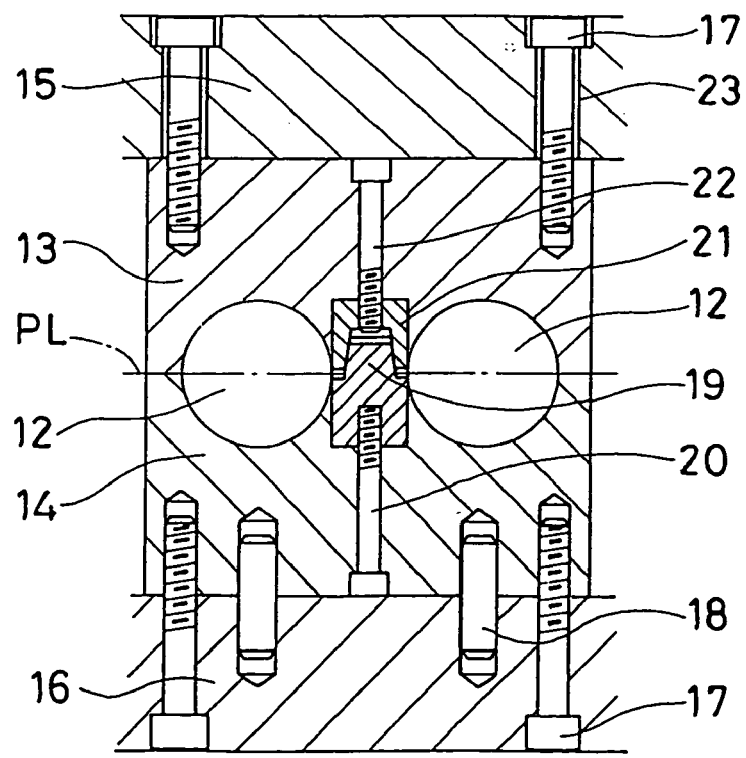
FIG. 2 is a partial magnified view of the same.

FIGS. 1 to 5 show embodiments of the blow mold device according to the present invention.

In the drawing, the numeral 11 indicates a blow mold, composed by taking a pair of split molds 13, 14 as a set of molds forming a plurality of blow cavities 12, 12 on the parting face, and attaching three sets of molds in parallel to mold-attaching plates 15, 16 disposing a clearance. The split molds 13, 14 are attached on the mold-attaching plates 15, 16 using bolts 17 and locating pins 18 similarly to the prior art, however, only the split mold 14 of one side is fixed by the locating pins 18, while the split mold 13 of the other side is fixed only by the bolts 17.

In the drawing, the split mold 14 is attached on the mold-attaching plate 16, by fitting a locating hole opened previously on the side face of the mold to the locating pins 18 provided previously on the inner face of the mold-attaching plate 16, and fixing more securely with the bolts 17.

The split mold 13 is attached on the mold-attaching plate 15 by inserting the bolts 17 into bolt holes 23, in the form of loose holes having a diameter larger than that of the bolt 17, perforated on the mold-attaching plate 15. In such a manner, the split mold 13 and the mold-attaching plate 15 are allowed to shift relatively and laterally by a space between the bolt 17 and the bolt hole 23.

Moreover, a joint comprises a taper pin 19 and a socket 21 having a fitting hole for preventing the shifting of the split mold 13 by the split mold 14, by coupling the split mold 13 and the split mold 14 integrally by the mold closing. The joint is fixed by bolts 20, 22 and buried in upper and lower molds (refer to FIG. 4) between a pair of blow cavities 12, 12.

Figure 5:
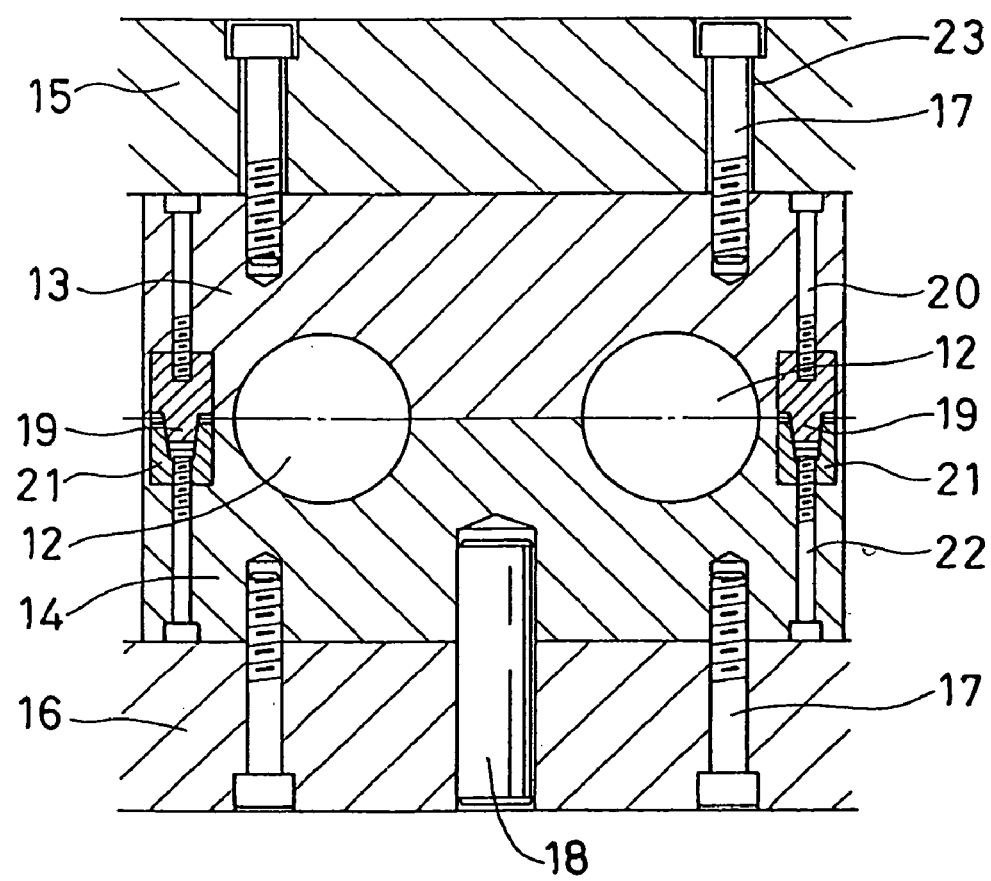
FIG. 5 is a partial magnified plane cross-section of another embodiment.

The position where the joint is buried is not limited between a pair of blow cavities 12, 12, but it may also be buried, as shown in FIG. 5, in the upper and lower molds outside the blow cavities 12, 12 by fixing with bolts 20, 22, or it may also be laid by changing the taper pin 19 on the split mold 13 side and the socket 21 on the split mold 14 side.

Figure 6:
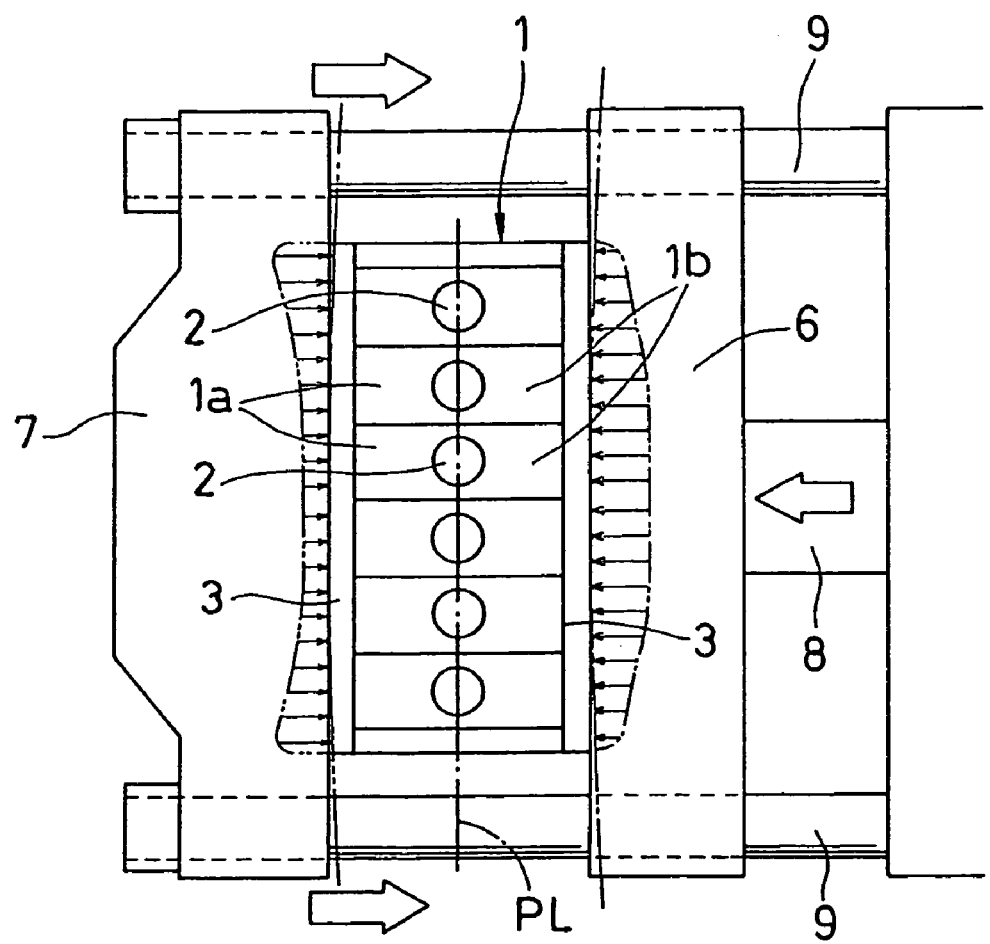
FIG. 6 is a plane view illustrating the deflection in a mold clamping apparatus where a conventional mold apparatus is attached.
Figure 7:
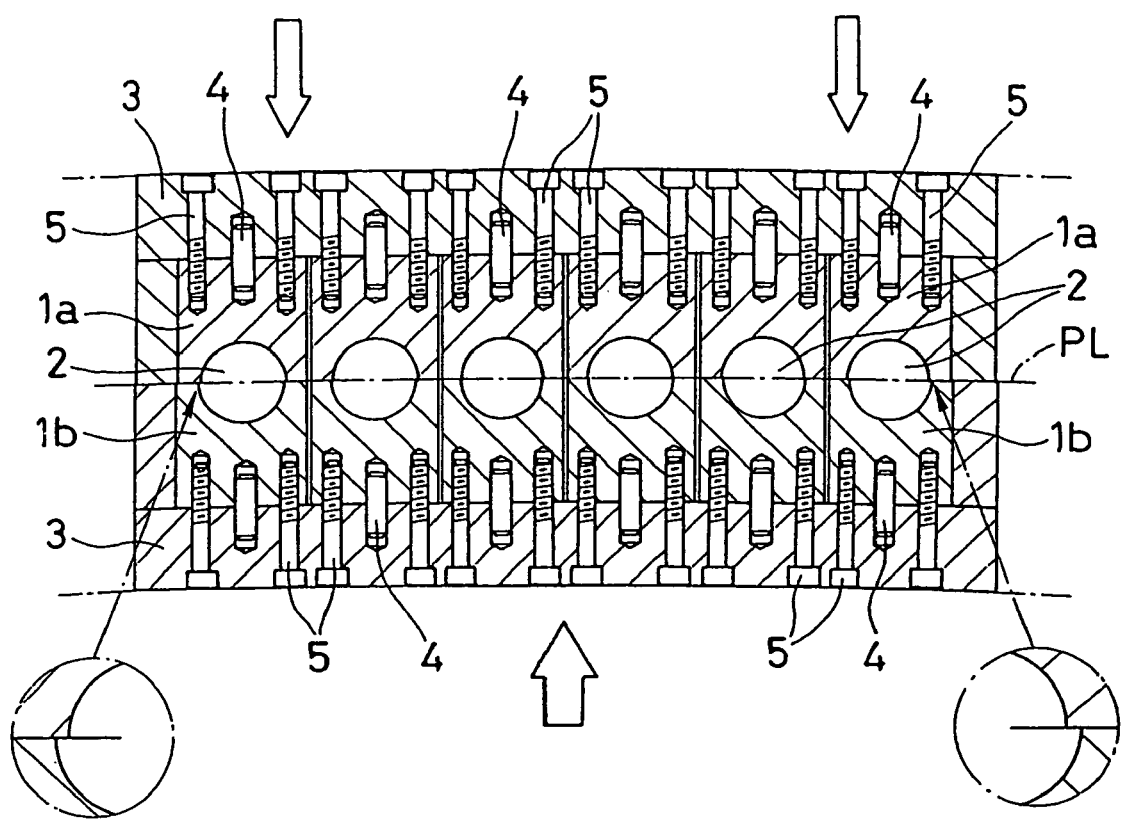
FIG. 7 is a plane cross-section of a conventional mold apparatus during the deflection.

The blow mold 11 of the aforementioned composition is used by attaching the split mold 13 side on an outside movable platen 7 of a mold clamping apparatus show in FIG. 6, and the split mold 14 side on an inside movable platen 6.

Figure 3:
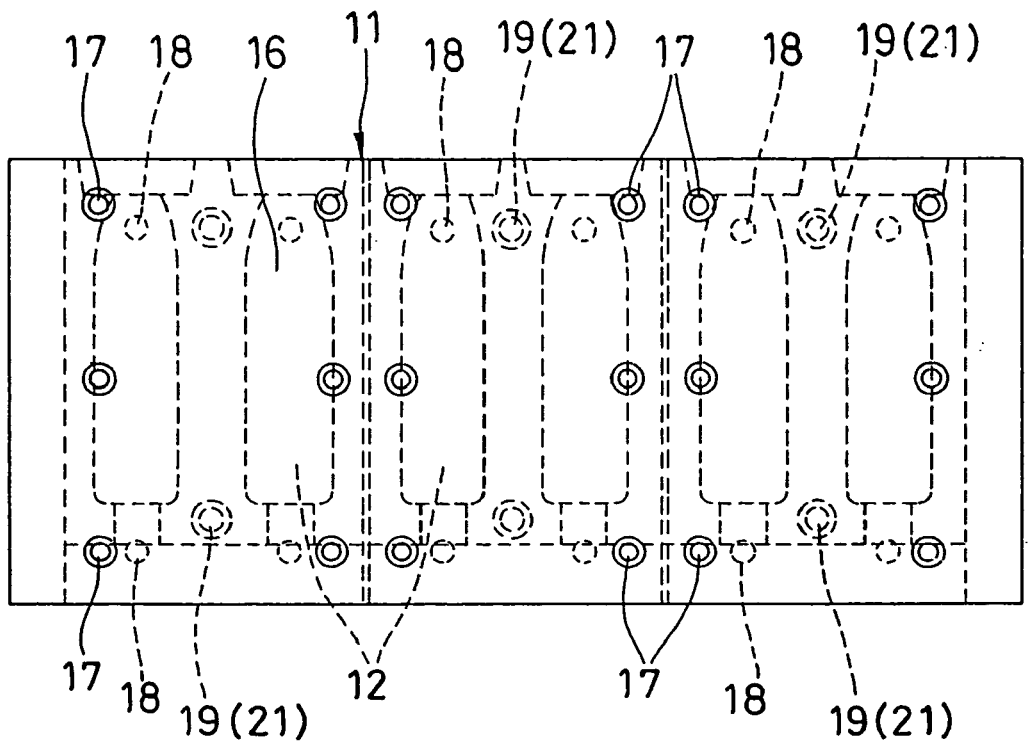
FIG. 3 is a vertical view of the blow mold device as above.
Figure 4:
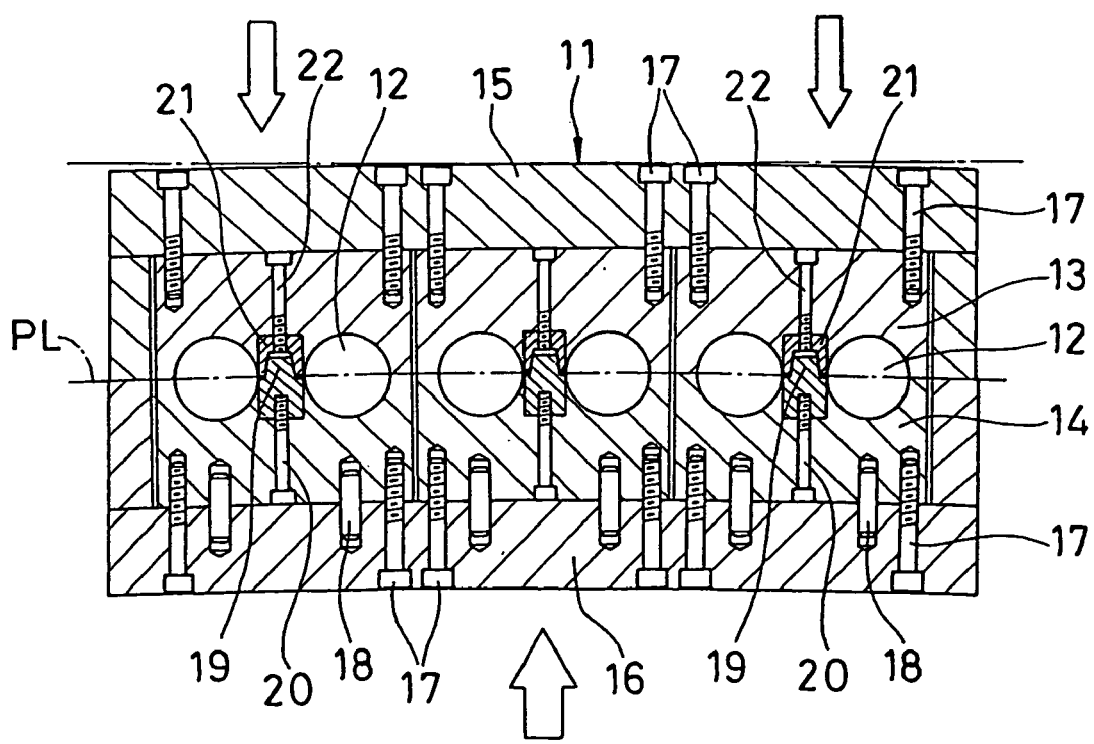
FIG. 4 is a plane cross-section of the blow mold device as above during the deflection.

In such a blow mold 11, the split mold 13 is attached on the mold-attaching plate 15 so as to shift laterally only by the bolt 17, even when the mold clamping force by the plunger 8 acts on the central section of the inside movable platen 6 during the mold clamping, the mold clamping force by the rods 9, 9 acts on both sides of the outside movable platen 7, and both movable platens 6, 7 are deflected with the mold-attaching plates 15, 16, and bent inwardly from the position of chain line in FIG. 3 and, moreover, as the split molds 13, 14 are integrated laterally by the joint, the deflection of the mold-attaching plate 15 is absorbed by a space between the bolt 17 and the bolt hole 23, and the both split molds 13, 13 are prevented from tilting inside by the deflection of the mold-attaching plate 15.

Also, the split molds 14, 14 of both sides, which are fixed to the mold-attaching plate 16 by the bolts 17 and the locating pins 18, finished up by tilting outward, due to the deflection of the mold-attaching plate 16 which deflects with the inside movable platen 6. As the split mold 14 is integrated with the split mold 13 by a joint, and as the split mold 13 is attached on the mold-attaching plate 15 so as to shift laterally, the split mold 13 finishes up by tilting with the split mold 14 in the tolerance range of the space between the bolt 17 and the bolt hole 23. Thereby, the shift of the parting line PL of the both is prevented, solving the defective of the product due to the parting line mark.

After the relief of stress as mold clamping force, the deflection of the split molds 13, 14 becomes undone with inside and outside movable platens 6, 7, removing the inclination of the split molds 13, 14, and as the taper pin 19 of the joint faces directly to the engagement hole of the socket 21, they finish up by engaging each other when the molds close next time. In addition, the prevention of shift of the parting line PL improves the attaching accuracy of the parting finished split molds onto the mold clamping apparatus, decreasing the necessity of refinish.

Though not shown, the elimination of parting line mark on the product, the blow cavity for flat bottle that has been formed along the parting line PL can be formed at right angles the parting line PL, allowing thereby to increase the number of cavities, even for the blow mold of flat bottles where the number of cavities is low and limited compared to the round body products.

INDUSTRIAL APPLICABILITY

While the presently preferred embodiment of the present invention has been shown and described, it will be understood that the present invention is not limited thereto, and that various changes and modifications may be made by those skilled in the art without departing from the scope of the invention as set forth in the appended claims.

I claim:

1. A blow mold device attaching a plurality of sets of molds in parallel on and between a pair of mold-attaching plates with a clearance defined between adjacent sets of molds, each such one set of molds constituting a pair of split molds forming a blow cavity, wherein;
   one split mold of the pair is attached with a bolt inserted in a loose bolt hole perforated in one mold-attaching plate so that the split mold and the mold-attaching plate can shift laterally and relatively in molds closing as far as within a space formed between the loose bolt hole and the bolt inserted therein,
   the other split mold of the pair is fixedly attached to the other mold-attaching plate with a locating pin implanted in the mold-attaching plate and a bolt, and in molds closing both split molds are connected integrally and closely on both parting faces of them, and both of a taper pin and a socket provided with the pair of molds as a joint operate to secure both the molds mutually so as for a parting line not to fluctuating.

2. The blow mold device of claim 1, wherein:
   the pair of split molds as one set of molds forms a plurality of blow cavities, and the joint is buried between the blow cavities or on the parting faces of both sides.

* * * * *